United States Patent [19]

Eck et al.

[11] Patent Number: 5,750,617
[45] Date of Patent: May 12, 1998

[54] PROCESS FOR THE PREPARATION OF BIOLOGICALLY DEGRADABLE AQUEOUS DISPERSIONS

[75] Inventors: Herbert Eck; Gerald Fleischmann. both of Burghausen; Konrad Wierer. Mehring, all of Germany

[73] Assignee: Wacker-Chemie GmbH. Munich, Germany

[21] Appl. No.: 689,092

[22] Filed: Aug. 5, 1996

Related U.S. Application Data

[62] Division of Ser. No. 164,252, Dec. 7, 1993, abandoned.

[30] Foreign Application Priority Data

Dec. 17, 1992 [DE] Germany ............ 42 42 781.9

[51] Int. Cl.$^6$ ............................................ C08K 5/34
[52] U.S. Cl. ................... 524/718; 524/726; 524/733; 524/734
[58] Field of Search .................... 524/733, 388, 524/52, 53, 718, 726, 734

[56] References Cited

U.S. PATENT DOCUMENTS 3,769,151 10/1973 Knutson et al. ............... 524/460

*Primary Examiner*—Jeffrey T. Smith
*Attorney, Agent, or Firm*—Burgess, Ryan & Wayne

[57] ABSTRACT

Biologically degradable aqueous dispersions of vinyl ester polymers are provided which have a solids content of 20 to 70% by weight, based on the total weight of the dispersions, and have been prepared by free radical polymerization by the emulsion polymerization process, wherein, in the presence of 10 to 50% by weight, based on the monomer phase, of biologically degradable plasticizer and 0.5 to 15.0% by weight, based on the monomer phase, of biologically degradable emulsifier and/or biologically degradable protective colloid, a monomer phase comprising a) 50 to 100 parts by weight of one or more vinyl esters from the group comprising vinyl esters of unbranched or branched alkylcarboxylic acids having 1 to 15 C atoms, b) 0 to 30 parts by weight of ethylene and/or an ester of (meth)acrylic acid or ethylenically unsaturated dicarboxylic acids from alcohols having 1 to 10 atoms and c) 0 to 20 parts by weight of other mono- or polyethylenically unsaturated compounds, is polymerized.

12 Claims, No Drawings

5,750,617

1

PROCESS FOR THE PREPARATION OF BIOLOGICALLY DEGRADABLE AQUEOUS DISPERSIONS

This is a division of application Ser. No. 08/164,252, filed Dec. 7, 1993, now abandoned.

BACKGROUND OF THE INVENTION

1) Field of the Invention

The invention relates to biologically degradable aqueous dispersions of vinyl ester polymers, processes for their preparation and their use.

2) Background Art

It is known that polyvinyl acetate is degraded biologically only slowly (Huang S. J., Biodegradable Polymers in: Encyclopedia of Polymer Sciences, Volume 2, pages 220–243). M. Buday (C.A. 101(4):24316n) has shown that polyvinyl acetate dispersions and butyl acrylate/vinyl acetate copolymer dispersions are degraded only relatively slowly even in activated sludge, and that the rate of degradation depends on the size of the particles and their specific surface area. Filmed material, such as is formed, for example, when vinyl acetate dispersions are used in the coating sector, is therefore considerably more resistant. The biological degradation of such a material takes several years in practice. The rate of degradation of crosslinked products is slowed down further according to the degree of cross-linking.

Plasticizing comonomers in vinyl ester copolymers, for example ethylene, butyl acrylate or 2-ethylhexyl acrylate, which are employed in adhesives or coating agents delay biological degradation still further. This action is explained by the fact that these comonomers delay hydrolysis of the vinyl acetate units into biologically degradable vinyl alcohol units (Huang, S. J., Biodegradable Polymers in: Encyclopedia of Polymer Sciences, Volume 2, pages 220–243).

The demand for plastics of good biological degradability is increasing rapidly, not least because of increasing environmental awareness. Thus, biologically degradable, aqueous, optionally, crosslinkable dispersions of plastics which can be employed as binders in coating and adhesive compositions are required by the textile and paper industry.

WO-A 91/02025 and EP-A 400532 described biologically degradable copolymer compositions which comprise ethylene/vinyl acetate copolymer, starch and plasticizer. They are prepared by mixing and coextruding the solid components of the composition.

The invention is therefore based on the object of providing aqueous dispersions of vinyl ester polymers which are biologically degradable and are suitable for use as coating agents and adhesives.

SUMMARY OF THE INVENTION

The invention relates to biologically degradable aqueous dispersions of vinyl ester polymers which have a solids content of 20 to 70% by weight, based on the total weight of the dispersion, and have bee prepared by free radical polymerization by the emulsion polymerization process, wherein, in the presence of 10 to 50% by weight, based on the monomer phase, of biologically degradable plasticizer and 0.5 to 15.0% by weight, based on the monomer phase, of biologically degradable emulsifier and/or biologically degradable protective colloid, a monomer phase comprising a) 50 to 100 parts by weight of one or more vinyl esters from the group comprising vinyl esters of unbranched or branched alkylcarboxylic acids having 1 to 15 C atoms, b) 0 to 30 parts by weight of ethylene and/or esters of (meth)acrylic acid or ethylenically unsaturated dicarboxylic acids from alcohols having 1 to 10 C atoms and c) 0 to 20 parts by weight of other mono- or polyethylenically unsaturated compounds is polymerized.

DESCRIPTION OF THE PREFERRED EMBODIMENTS

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 or 10 C atoms, for example VeoVa9™ or VeoVa10™.

Preferred esters of methacrylic acid, acrylic acid or ethylenically unsaturated dicarboxylic acids are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and esters and half-esters of fumaric acid and/or maleic acid, such as diisopropyl fumarate.

Suitable comonomers c) are functional comonomers such as acrylamide, maleic acid monoamide, vinyl sulfonate, N-vinylpyrrolidone and N-vinyllactones. Comonomers which are also suitable are crosslinkable comonomers, such as vinyl acetoacetate, or other copolymerizable acetoacetates; copolymerizable alkoxysilane epoxide compounds, such as vinyl or allyl compounds of glycidyl alcohol; N-methylol compounds, such as N-methylolacrylamide, N-methylolmethacrylamide and N-methylolallylcarbamate; and N-alkoxyalkylamides of ethylenically unsaturated carboxylic acids, such as N-(isobutoxymethyl)-acrylamide. Comonomers which are furthermore suitable are polyethylenically unsaturated comonomers such as divinyl and diallyl ethers of glycols; divinyl and diallyl esters of saturated dicarboxylic acids; polyvinyl and polyallyl esters of polycarboxylic acids, for example diallyl phthalate and diallyl maleate; di- and polyesters of di- and polyhydroxy compounds with (meth)acrylic acid; vinyl and allyl esters of (meth)acrylic or crotonic, maleic or fumaric acid; and divinylbenzene and triallyl cyanurate.

Preferably, only vinyl acetate is polymerized, if appropriate with 0.1 to 10 parts by weight of functional and/or crosslinkable comonomers c). Other preferred compositions of the monomer phase are:

75 to 95 parts by weight of vinyl acetate, 5 to 25 parts by weight of ethylene and, if appropriate, 0.1 to 10 parts by weight of functional and/or crosslinkable comonomers c).

65 to 95 parts by weight of vinyl acetate, 5 to 35 parts by weight of vinyl laurate, 1-methylvinyl acetate, vinyl pivalate, VeoVa9 or VeoVa10 and, if appropriate, 0.1 to 10 parts by weight of functional and/or crosslinkable comonomers c).

50 to 70 parts by weight of vinyl acetate, 5 to 30 parts by weight of VeoVa9 or VaoVe10, 5 to 25 parts by weight of ethylene and, if appropriate, 0.1 to 10 parts by weight of functional and/or crosslinkable comonomers c).

50 to 70 parts by weight of vinyl acetate, 5 to 25 parts by weight of ethylene, 0.5 to 20 parts by weight of (meth)acrylic acid ester and, if appropriate, 5 to 30 parts by weight of VeoVa9 or VeoVa10 and/or 0.1 to 10 parts by weight of functional and/or crosslinkable comonomer c).

Suitable biologically degradable plasticizers are the alkyl esters of the $C_4$- to $C_{12}$-α,ω-alkanedicarboxylic acids, in which the alkyl radicals of the ester groups can contain 2 to 18 C atoms. Examples which may be mentioned are: sebacic acid esters, such as dibutyl sebacate; ethylene glycol derivatives, glycerol derivatives and sorbitol derivatives of laurate, and citric acid esters, such as tributyl citrate. Polymeric plasticizers, such as adipic acid ethylene glycol polyester, polyethylene glycol and polypropylene glycol having a molecular weight of 800 to 5000, preferably 1500 to 3000, are preferred. The polymeric plasticizers just mentioned with ester, amide or urethane end groups are particularly preferred. The plasticizers mentioned can also be employed as mixtures.

Either nonionic emulsifiers or combinations of biologically degradable nonionic and anionic emulsifiers can be employed as biologically degradable emulsifiers. Nonionic emulsifiers are preferred.

Examples of suitable nonionic emulsifiers are polyoxyethylene condensation products, such as polyoxyethylene lauryl ether, polyoxyethylene oleyl ether and polyoxyethylene hydroabietyl ether. Other examples are polyoxyethylene esters of higher fatty acids, such as polyoxyethylene laurate, polyoxyethylene oleate and condensation products of ethylene oxide with resin acids and tall oil acids, polyoxyethyleneamides and amine condensation products, such as N-polyethylene-lauramide and N-lauryl-N-polyoxyethyleneamine, polyoxyethylene thioethers, such as polyoxyethylene n-dodecyl thioether, ethylene oxide/propylene oxide copolymers and polyglycol ether of fatty alcohols with ethylene oxide units. Instead of the polyoxyethylene compounds mentioned, the corresponding poly-N-formyl- or poly-N-acetylaminethylenes can also be employed.

The nonionic emulsifiers which can be used according to the invention also include a number of surface-active agents which are known as "Pluronics" and have the general formula:

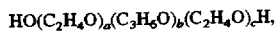

$HO(C_2H_4O)_a(C_3H_6O)_b(C_2H_4O)_cH$, in which a, b and c are integers of 1 or more. When b increases and a and c remain largely constant, the compounds become less water-soluble and more oil-soluble and therefore more hydrophobic.

Examples of suitable anionic emulsifiers are alkali metal or ammonium salts of fatty acids, alkyl-sulfates and alkyl-sulfonic acids, such as the salts of lauric acid, lauryl-sulfate or laurylsulfonate. Other examples are sulfosuccinic acid half-esters of mono-fatty alcohols.

The concentration range for the total amount of emulsifiers is in the range from 0.5 to 15% by weight, based on the monomer phase. Either individual emulsifiers or combinations of the emulsifiers mentioned can be used. If combinations of emulsifiers are used, it is advantageous to use a relatively hydrophobic emulsifier in combination with a relatively hydrophilic emulsifier. A relatively hydrophobic emulsifier is one having a turbidity point in 1% strength aqueous solution below 88° C. and a relative hydrophilic emulsifier is one having a turbidity point in 1% strength aqueous solution of 88° C. or higher.

In addition to the emulsifier, the dispersions according to the invention can also comprise protective colloids or exclusively protective colloids for stabilization. Suitable biologically degradable protective colloids which may be mentioned are:
starches; cyanoalkylated, hydroxyalkylated and/or carboxymethylated starches; dextrins, gelatin and casein, and furthermore methyl-, hydroxyethyl-, hydroxypropyl- and acetylcelluloses; as well as polyvinyl alcohols, polyvinylcaprolactam, polyvinylpyrrolidone and water-soluble copolymers of the last three classes of compound mentioned.

The amount of these protective colloids which can be employed depends on the viscosity and the amount needed for stabilization. Thus, for example, if a readily stabilizing starch is used, 1% by weight, based on the monomer phase, is already sufficient. However, not more than 8% by weight, based on the monomer, can be employed because of its high viscosity. In contrast, up to more than 100% by weight, based on the monomer phase, of low molecular weight dextrins can be employed. If the usual polyvinyl alcohols are used, in general more than 3% by weight, based on the monomer phase, is necessary if no emulsifiers are additionally used.

The emulsion polymerization process according to the invention is carried out at 0° to 100° C., preferably at 35° to 80° C. For copolymerization of ethylene, the preferred pressure range is up to 100 bar. If no ethylene is copolymerized, the polymerization is carried out at most under the autogenous pressure of the monomers at the particular polymerization temperature.

The emulsion polymerization is preferably carried out with redox catalyst systems. In this procedure, the reducing agent and the oxidizing agent can be metered in according to the reaction, or all the oxidizing agent is initially introduced into the reaction vessel and the polymerization is controlled by metering in the reducing agent. 0.01 to 1.5% by weight, preferably 0.03 to 0.8% by weight, based on the monomer phase, of oxidizing agent is needed. The reducing agent is preferably employed in an amount of 0.01 to 1.0% by weight, based on the monomer phase. Examples of the oxidizing component of the catalyst are ammonium or potassium persulfate, hydrogen peroxide, t-butyl hydroperoxide, peroxodiphosphates, such as potassium, sodium and ammonium peroxodiphosphate, and peroxodisulfates, such as ammonium peroxodisulfate. Examples of the reducing agent component are sodium sulfite, sodium bisulfite, zinc formaldehyde-sulfoxylate or sodium formaldehyde-sulfoxylate. $H_2$/noble metal catalysts, simultaneously using small amounts of heavy metal salts as activators, are likewise suitable. Suitable redox catalyst systems are described, inter alia, in "Fundamental Principles of Polymerization" G. F. Alelio, J. Wiley and Sons, Inc., New York, 1952 on pages 333 et seq.

In principle, it is also possible to use free radical catalysts, for example hydroperoxides, persulfates or peroxodiphosphates, in the absence of reducing agents. It is possible to use accelerators, for example traces of iron salts, both in this system and in those mentioned above.

The copolymerization is preferably carried out at a pH of between 2.5 and 7. The pH can initially be established with small amounts of acids or bases. Buffer substances can also be added in order to prevent too sharp a drop in pH during the polymerization. Examples of these substances are sodium carbonate or ammonium carbonate, borax, sodium acetate and sodium citrate, and mixtures of primary and secondary alkali metal phosphates.

The emulsion polymerization according to the invention is preferably carried out by a metering method. In this, preferably, 5 to 30% by weight of the vinyl esters a) employed and the other comonomers, apart from the comonomers c), are initially introduced into the reaction vessel and the remainder of the monomer phase is metered in. If ethylene is copolymerized, it can be initially introduced all at once or partly metered in. Preferably, the ethylene pressure is established before the polymerization and is then kept constant throughout the duration of the polymerization, if appropriate by subsequently forcing in ethylene. The ethylene pressure can of course also be varied during the polymerization reaction if this is desired, for example for the preparation of polymers of different composition.

The emulsifiers and if appropriate the protective colloids are initially introduced into the reaction vessel or are completely or partly metered in. Addition of the portion of emulsifiers of protective colloids to be metered in is preferably started at the latest when the solids content of the dispersion has reached 35% by weight. The solids content of the dispersions according to the invention can be varied between 20 and 70% by weight. A comparatively low viscosity of the dispersions results even at a high solids content.

The biologically degradable dispersions according to the invention are suitable as coating agents and adhesives, for example for paper, textiles, glass fibers, wood and cardboard.

The biological degradability of the dispersions is accelerated by the content of biologically degradable plasticizer, emulsifier and, if appropriate, biologically degradable protective colloid, since the degradation by microorganisms initially starts mainly on these materials, which means that the surface area and as a result in turn the rate of degradation of the vinyl ester polymers is increased. The rapid decay of filmed and optionally crosslinked specimens and the good polymerization properties of the monomer/plasticizer mixtures were surprising.

The examples which follow serve to further illustrate the invention:

Preparation of the Dispersions

The dispersions were prepared in a double-walled 2 l reaction vessel with an anchor-type stirrer. The monomers and auxiliaries were added via fine metering vessels. The catalysts (APS/Brüggolit) were metered in as 4% strength and 2% strength solutions respectively using a hose pump. The temperature was kept constant at 45° C. with the aid of a thermostat and an internal temperature regulator.

The initial mixture was composed of:

40 g (8% by weight) of the mixture of monomer and plasticizer shown in Table 1

220 g of water 0.59 g of Aerosol A102 (sulfosuccinic acid half-ester of mono-fatty alcohols having 10 to 12 C atoms) as a 30% strength solution 1.07 g of Genapol PF40 (ethylene oxide/propylene oxide copolymer) as a 97% strength solution 0.2 g of iron ammonium sulfate The initial mixture was brought to pH 3.4 with formic acid.

Meterings 1 and 2 were added to the initial mixture:

Metering 1 (Metering Time About 6 Hours)

2.92 g of ammonium peroxodisulfate in 70 ml of water

Metering 2 (Metering Time About 6 Hours)

1.48 g of Brüggolit in 72.5 ml of water

After the polymerization had started, meterings 3 and 4 were started:

Metering 3 (Metering Time About 3.5 Hours)

460 g (92% by weight) of the mixture of monomer and plasticizer shown in Table 1 with 3 ml of Vanisol solution Metering 4 (Metering Time About 3.5 Hours)

6.16 g of acrylic acid 42.5 g of N-methylolacrylamide (48% strength aqueous solution)

48.0 g of Genapol OX130 (polyglycol ether of fatty alcohols having 13 ehtylene oxide groups) as a 25% strength solution 24.0 g of water The dispersions thus prepared were characterized in respect of solids content, residual monomer content, viscosity, K value and particle size. The wet residue and dispersion stability were evaluated. The results are summarized in Table 1.

To evaluate the film properties of the dispersions prepared in the examples, the dispersions were poured into a mold and then dried. A film with a film thickness of about 1 mm resulted. The strength, tackiness, exudation, appearance and hardness of the film were evaluated visually. The results are summarized in Table 1.

To evaluate the biological degradability, films 0.2 mm thick were produced by the abovementioned method and these were subjected to a fungus test in accordance with ISO 846 method B. The fungal growth and pitting were determined after 14 days. The results are likewise summarized in Table 1.

TABLE 1

| Example: | Example 1 | Example 2 | Example 3 | Example 4 | Example 5 | Comparison Example 1 |
|---|---|---|---|---|---|---|
| Monomer [% by weight]: | | | | | | |
| Vinyl acetate | 60 | 60 | 60 | 77 | 60 | 85 |
| Vinyl laurate | 15 | 15 | 15 | | 15 | 15 |
| Plasticizer [% by weight]: | | | | | | |
| Tributyl citrate | 12.5 | | | | | |
| Dibutyl sebacate | 12.5 | 12.5 | | | | |
| Ethylene glycol adipic acid polyester | | | | | | |
| Desmophen 2020 | | 12.5 | | 23 | | |
| Acetylated Desmophen 2020 | | | | | | |
| Polypropylene glycol 2000 | | | 25 | | | |
| Acetylated PPG 2000 | | | | | 25 | |
| Analyses: | | | | | | |
| Solids content [%] | 49.9 | 51.0 | 49.2 | 47.1 | 44.2 | 52.0 |
| Residual monomer [%] | 0.8 | 0.6 | 0.3 | 0.3 | 0.8 | 0.4 |
| Viscosity [mPas] | 136 | 380 | 122 | 126 | 50000 | 270 |

TABLE 1-continued

| Example: | Example 1 | Example 2 | Example 3 | Example 4 | Example 5 | Comparison Example 1 |
|---|---|---|---|---|---|---|
| K. value | 29 | 51 | 38 | 59 | 50 | 76 |
| Particle size [nm] | 307 | 358 | 220 | 491 | 299 | 669 |
| Wet residue [g] | 0.1–1.0 | <0.1 | 0.1–1.0 | 0.1–1.0 | 0.1–1.0 | 0.1–1.0 |
| Dispersion stability | stable | stable | stable | stable | stable | stable |
| Film properties: | | | | | | |
| Strength | none | moderate | none | moderate | moderate | good |
| Tackiness | severe | some | some | none | some | none |
| Exudation | none | none | none | none | none | none |
| Appearance | milky | milky | milky | milky | milky | milky |
| Hardness | soft | soft | soft | hard | soft | hard |
| Biological degradability: | | | | | | |
| Fungal growth | heavy | heavy | very heavy | heavy | heavy | none |
| Pitting | distinct | distinct | heavy | heavy | distinct | none |

We claim:

1. A process for the production of a biologically degradable aqueous dispersion of a vinyl ester polymer having a solids content of 20 to 70% by weight, based on the total weight of the dispersion, by free radical polymerization with the emulsion polymerization process of a monomer phase comprising:
   a) 50 to 100 parts by weight of at least one ester comprising vinyl esters of branched and unbranched or alkylcarboxylic acids having 1 to 15 C atoms,
   b) 0 to 30 parts by weight of ethylene and/or ester of (meth)acrylic acid or ethylenically unsaturated dicarboxylic acids from alcohols having 1 to 10 atoms and
   c) 0 to 20 parts by weight of other mono- or polyethylenically unsaturated compounds, wherein the polymerization is carried out at 0° to 100° C. in the presence of a redox catalyst system and in the presence of 10 to 50% by weight, based on the monomer phase, of biologically degradable plasticizer and 0.5 to 15.0% by weight, based on the monomer phase, of biologically degradable emulsifier and/or biologically degradable protective colloid, and wherein 5 to 30% by weight of the vinyl esters a) employed and the other comonomers, apart from comonomer c), are initially introduced into the reaction vessel, and the remainder is metered in and the emulsifier and/or protective colloids are initially introduced into the reaction vessel or are metered in completely or in part.

2. The process of claim 1 wherein the biologically degradable plasticizer is at least one member selected from the group consisting of alkyl esters of $C_4$- to $C_{12}$-α,ω-alkanedicarboxylic acids, in which the alkyl radicals of the ester groups contains 2 to 18 C atoms, adipic acid ethylene glycol polyester, polyethylene glycol and polypropylene glycol having a molecular weight of 800 to 5000.

3. The process of claim 1 wherein the biologically degradable emulsifier is at least one member selected from the group consisting of polyoxyethylene condensation products, polyoxyethylene esters of higher fatty acids, polyoxyethyleneamides, polyoxyethylene thioethers, ethylene oxide/propylene oxide copolymers and polyglycol esters of fatty alcohols with ethylene oxide units.

4. The process of claim 1 wherein the biologically degradable protective colloids is at least one member selected from the group consisting of starch, cyanoalkylated, hydroxyalkylated and/or carboxymethylated starch, dextrin, gelatin, casein, methylhydroxyethyl-, hydroxypropryl- and acetylcelluloses, polyvinyl alcohols, polyvinylcaprolactam and polyvinylpyrrolidone.

5. The process of claim 1 wherein the comonomer phase is composed of vinyl acetate, optionally with 0.1 to 10 parts by weight of comonomers c).

6. The process of claim 1 wherein the comonomer phase is composed of 75 to 95 parts by weight of vinyl acetate, 5 to 25 parts by weight of ethylene and, optionally, 0.1 to 10 parts by weight of comonomers c).

7. The process of claim 1 wherein the comonomer phase is composed of 65 to 95 parts by weight of vinyl acetate, 5 to 35 parts by weight of vinyl laurate, 1-methylvinyl acetate, vinyl pivalate, vinyl esters of α-branched moncarboxylic acids having from 9 to 10 carbon atoms and, optionally, 0.1 to 10 parts by weight of comonomers c).

8. The process of claim 1 wherein the comonomer phase is composed of 50 to 70 parts by weight of vinyl acetate, 5 to 30 parts by weight of vinyl esters of α-branched moncarboxylic acids having from 9 to 10 carbon atoms 5 to 25 parts by weight of ethylene and, optionally, 0.1 to 10 parts by weight of comonomers c).

9. The process of claim 1 wherein the comonomer phase is composed of 50 to 70 parts by weight of vinyl acetate, 5 to 25 parts by weight of ethylene, 0.5 to 20 parts by weight of (meth)acrylic acid ester and, optionally, 5 to 30 parts by weight of vinyl esters of α-branched moncarboxylic acids having from 9 to 10 carbon atoms and/or 0.1 to 10 parts by weight of functional and/or crosslinkable comonomers c).

10. A biologically degradable aqueous dispersion prepared by the process of claim 1.

11. An adhesive containing the biologically degradable aqueous dispersion of claim 10.

12. A coating composition containing the biologically degradable aqueous dispersion of claim 10.

* * * * *